US011888440B2

(12) United States Patent
Galitev et al.

(10) Patent No.: US 11,888,440 B2
(45) Date of Patent: *Jan. 30, 2024

(54) APPARATUS AND METHOD OF A UNIVERSAL MODULE JUNCTION BOX

(71) Applicants: Teodor Galitev, San Jose, CA (US); Wei Shan, Fremont, CA (US)

(72) Inventors: Teodor Galitev, San Jose, CA (US); Wei Shan, Fremont, CA (US)

(73) Assignee: JA SOLAR USA INC., San Jose, CA (US)

(*) Notice: Subject to any disclaimer, the term of this patent is extended or adjusted under 35 U.S.C. 154(b) by 697 days.

This patent is subject to a terminal disclaimer.

(21) Appl. No.: 16/424,879

(22) Filed: May 29, 2019

(65) Prior Publication Data

US 2020/0136554 A1 Apr. 30, 2020

Related U.S. Application Data

(63) Continuation of application No. 15/171,597, filed on Jun. 2, 2016, now Pat. No. 10,404,208.

(60) Provisional application No. 62/169,758, filed on Jun. 2, 2015.

(51) Int. Cl.
*H02S 40/34* (2014.01)
*H02S 40/32* (2014.01)

(52) U.S. Cl.
CPC .............. *H02S 40/34* (2014.12); *H02S 40/32* (2014.12)

(58) Field of Classification Search
CPC .................................. H02S 40/34; H02S 40/32
See application file for complete search history.

(56) References Cited

U.S. PATENT DOCUMENTS

2008/0232040 A1 9/2008 Li
2015/0101563 A1 4/2015 Cioffi

FOREIGN PATENT DOCUMENTS

| DE | 10331780 | 3/2005 |
|---|---|---|
| EP | 0793278 | 3/1997 |
| WO | WO 2012163983 | 6/2012 |

OTHER PUBLICATIONS

Communication pursuant to Rules 70(2) and 70a(2) EPC, dated Jan. 3, 2019.
Extended European International Search Report, dated Jul. 12, 2018.
AUO AC Unison Solar Power System Installation Guide, Feb. 2012.

*Primary Examiner* — Tae-Sik Kang
(74) *Attorney, Agent, or Firm* — Peter Su; RADLO & SU

(57) ABSTRACT

Embodiments of the present disclosure are directed to a universal junction box for solar modules that comprises multiple sub-assemblies with a replaceable diode black and an open-IP plug sub-assembly. The universal junction box includes a first sub-assembly (junction box platform), a second sub-assembly (a replaceable diode block), and a third sub-assembly (an open sub-assembly or plug sub-assembly). If the electronics in the diode block becomes defective, a new replaceable diode block can be used to substitute into the defective diode black without having to replace the entire junction box. The open-IP plug sub-assembly provides the flexibility to couple a variety of cable sub-assembly or IMEs to the universal junction box as long as a particular selected cable sub-assembly fits with the dimension of the open-IP plug sub-assembly.

29 Claims, 18 Drawing Sheets

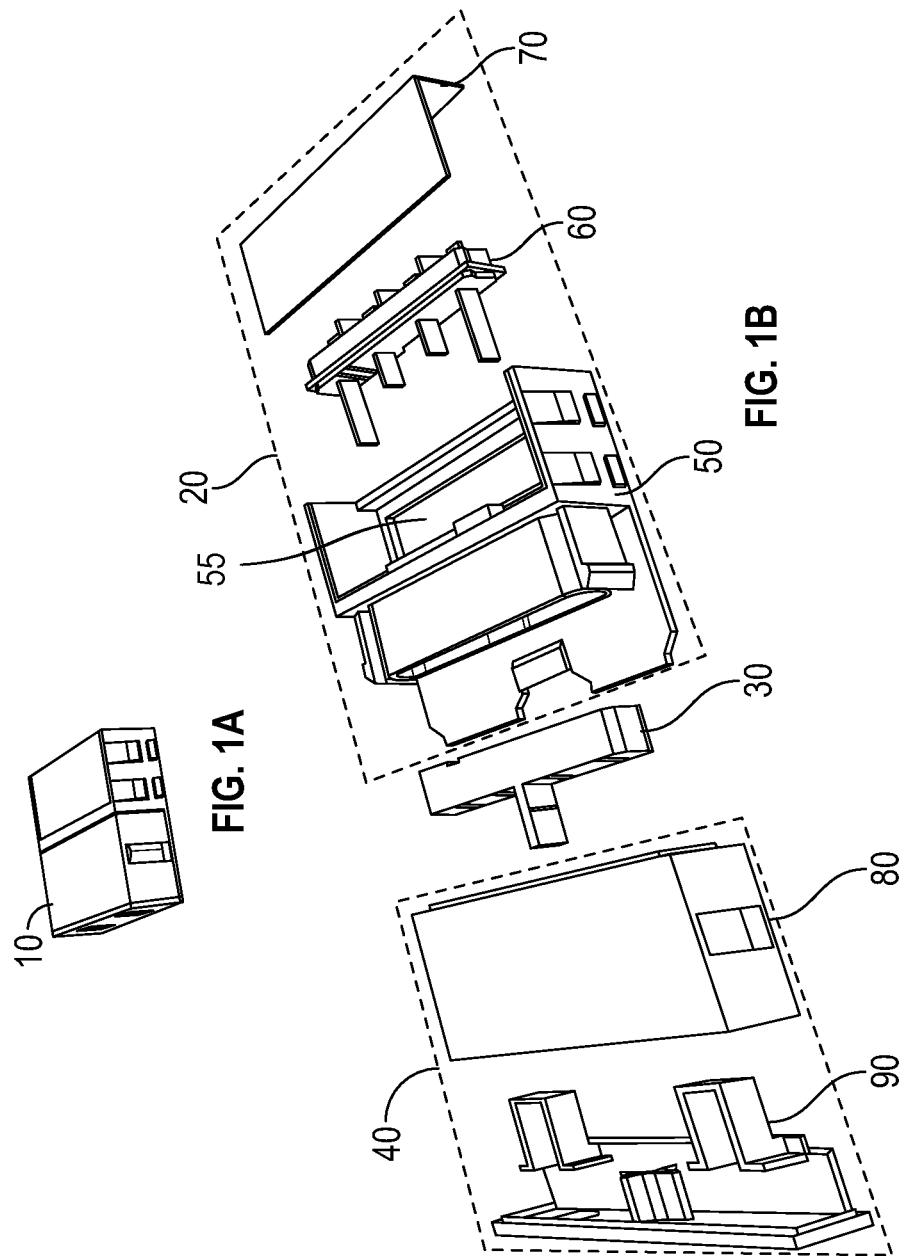

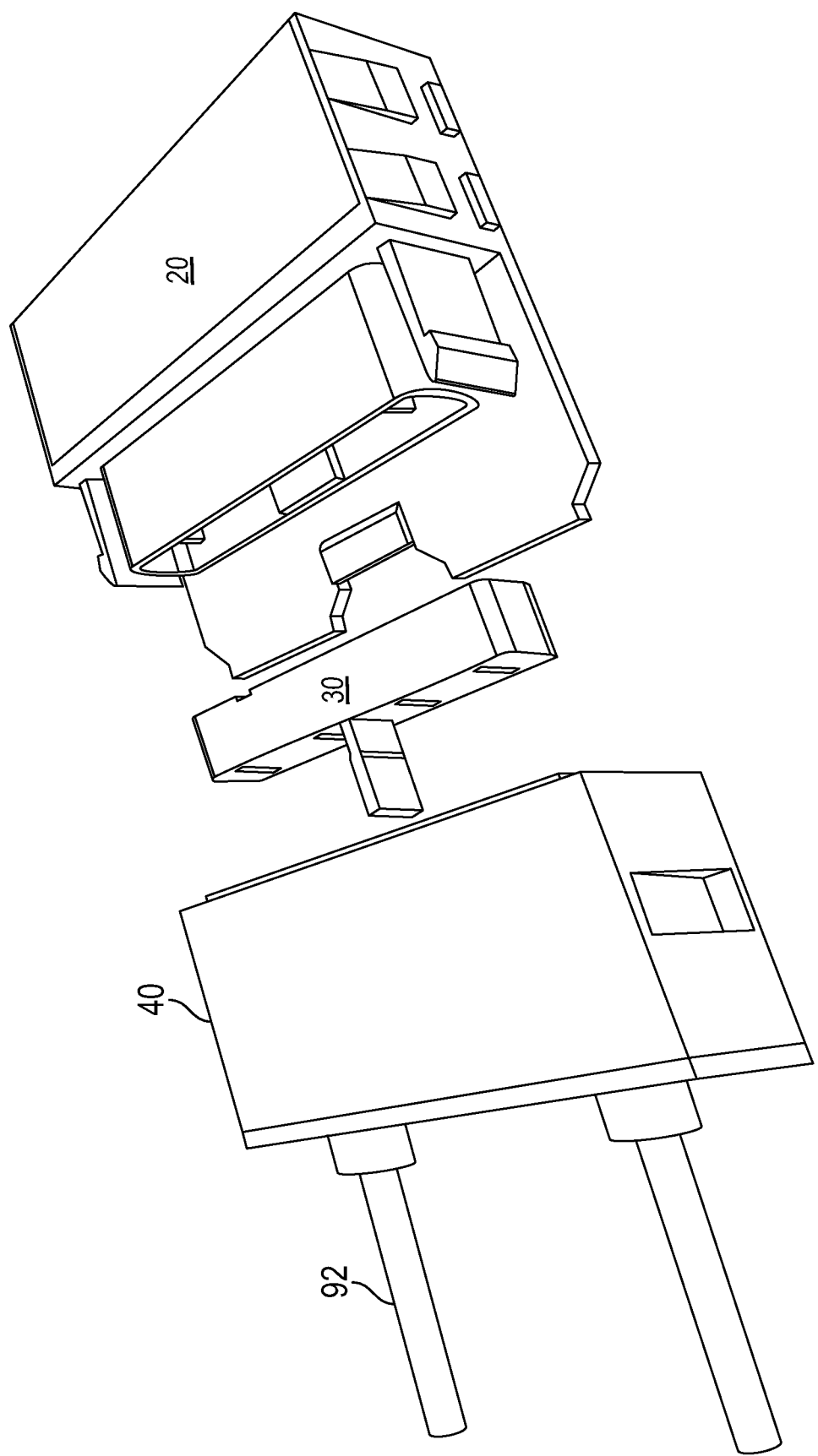

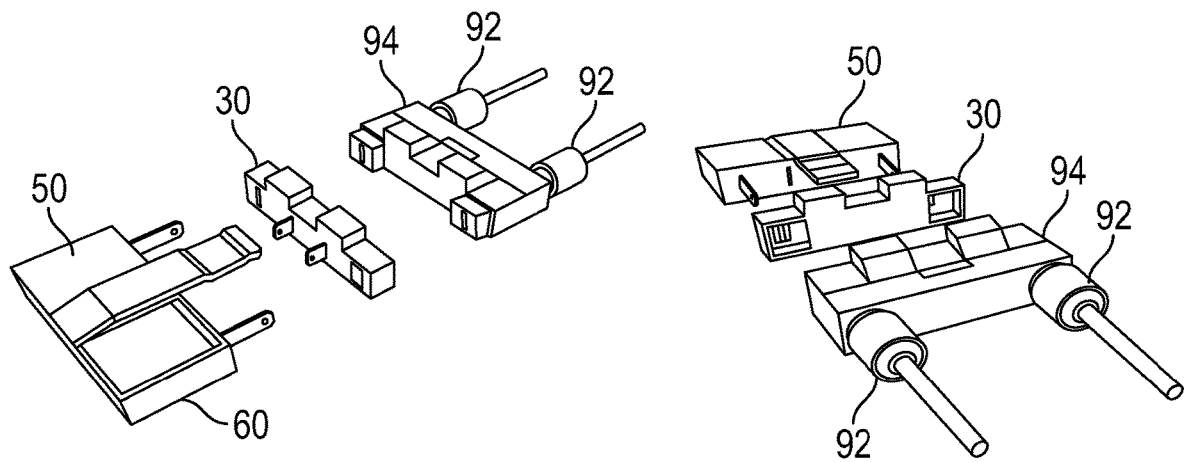
FIG. 9A
FIG. 9B
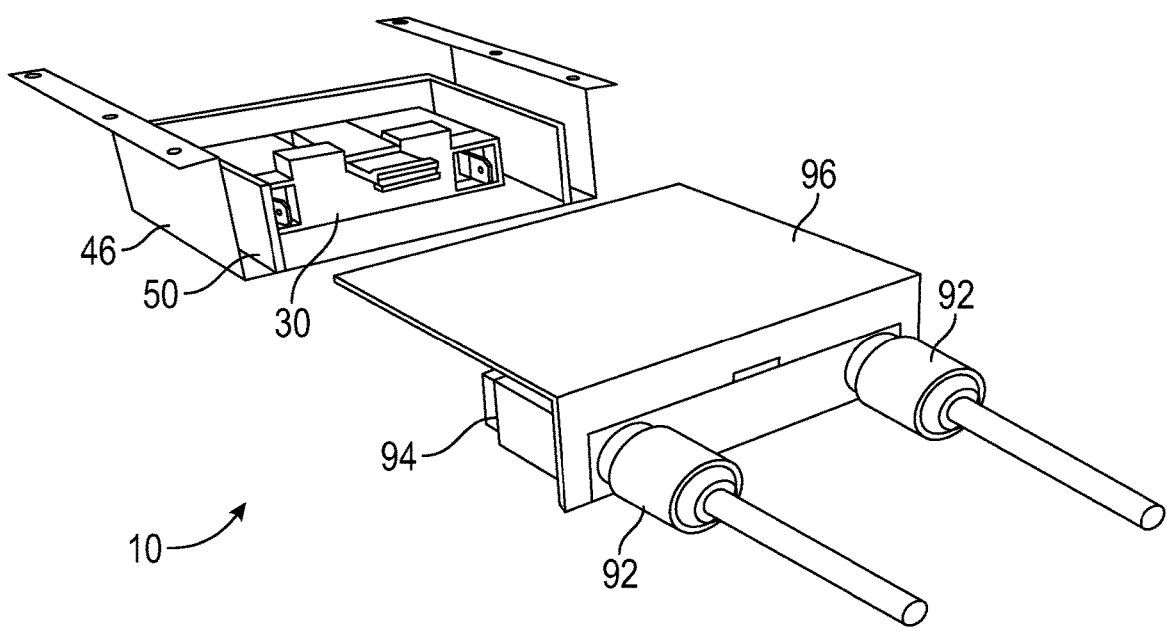
FIG. 9C

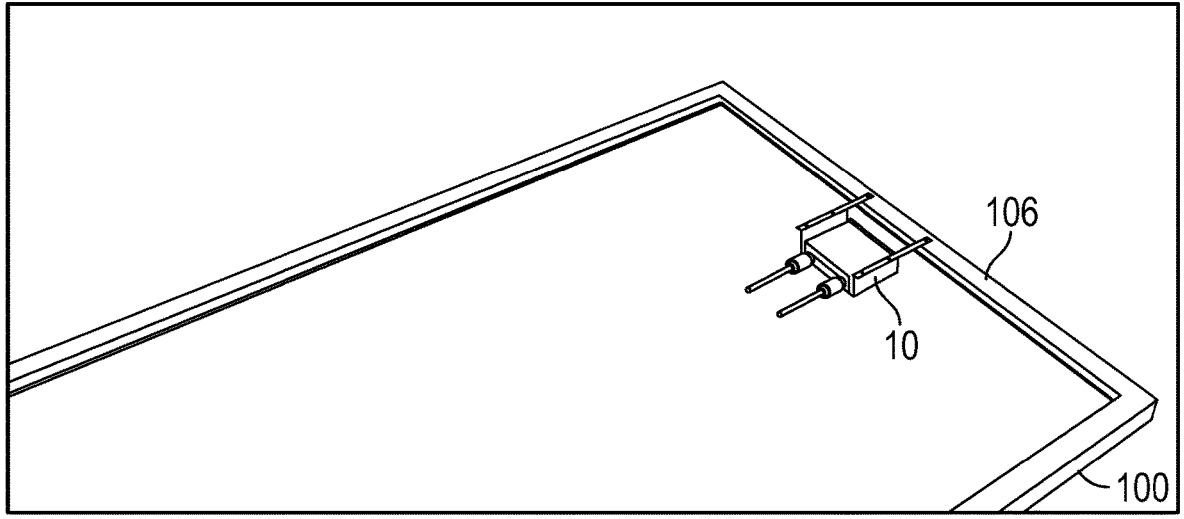
FIG. 14A
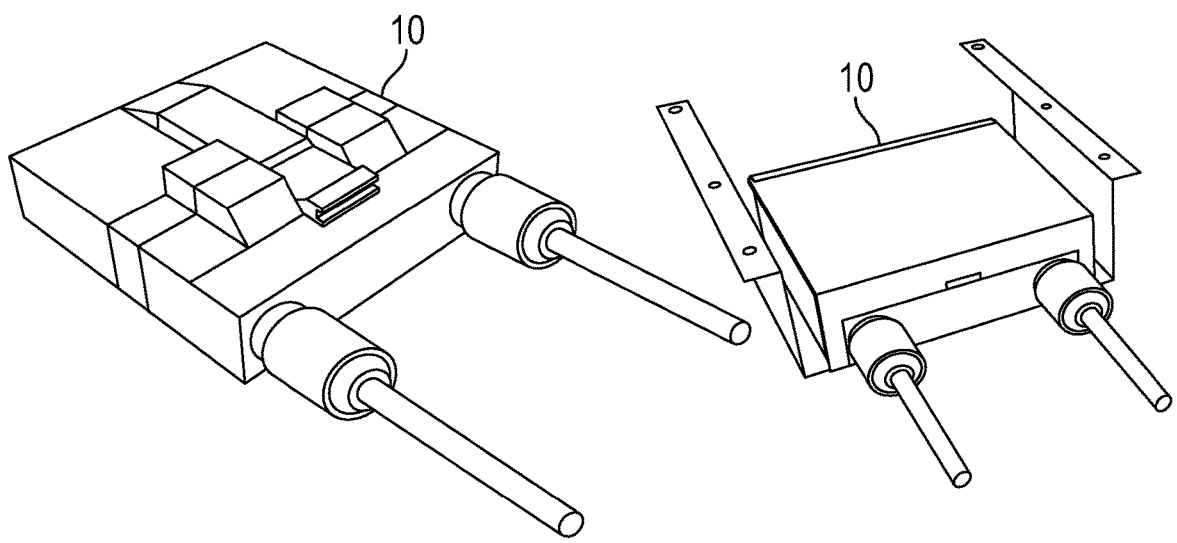
FIG. 14B
FIG. 14C

APPARATUS AND METHOD OF A UNIVERSAL MODULE JUNCTION BOX

CROSS REFERENCE TO RELATED PATENT APPLICATIONS

This application is a continuation of U.S. patent application Ser. No. 15/171,597 entitled "Apparatus and Method of a Universal Module Junction Box," now U.S. Pat. No. 10,404,208, filed on 2 Jun. 2016, which claims priority to U.S. Provisional Application Ser. No. 62/169,758 entitled "AC Ready Module Junction Box and Method of Making It," filed on 2 Jun. 2015, the disclosures of which are incorporated herein by reference in their entireties. This application is also related to U.S. Non-Provisional application Ser. No. 16/417,626 entitled "Apparatus and Method of a Universal Module Junction Box," filed on 20 May 2019, which is incorporated herein by reference in its entirety.

TECHNICAL FIELD

The present invention relates generally to solar technologies and, more particularly, to a solar junction box assembly for providing electronics to solar panels.

BACKGROUND OF INFORMATION

Solar power industry has grown rapidly over the past decade, as more environmentally-conscious countries are advancing renewal energy and conserving earthly resources to combat against global warming and climate change. The urgency to scale back on carbon emissions cannot be overstated, statement which was promulgated in the gathering of leaders around the globe during the 2015 United Nations Climate Change Conference, COP 21 or CMP 11, in Paris, France. The increased use of solar energy is a centerpiece strategy to reduce the reliance on petroleum, along with other several solar initiatives that have been launched.

Constructions of solar farms and solar projects, plus installations of solar panels at offices and residential homes, provide an energy efficient mechanism to absorb the sun rays as a source of energy for generating electricity or heating. A solar module or a photovoltaic (PV) module is a packaged and connected assembly with a matrix of solar cells. Each solar module is rated by its direct current (DC) output power under a set of test conditions. One industrial leading company designing and manufacturing solar cells and solar modules is JA Solar, www.jasolar.com.

Most solar panel installations contain an array of solar modules to supply a greater aggregate amount of power. Like any electrical product, there is a life cycle to electronic circuitry, or sometimes there is a failure in an electrical component. When a solar module becomes defective due to an electrical failure, one current solution is to replace the entire module with a new solar module. Such approach can be expensive, either singularly as a solar module or cumulatively for multiple solar modules. The current "in-module" electronics (IME) is quite fractured and difficult to implement, representing a risk for solar cell and module companies to incorporate IME into their solar modules. Another shortcoming of the conventional solution is that the solar module manufactures are required to customize the output specification of the solar modules depending on the choice of the coupling assembly to the solar modules.

Accordingly, it is desirable to have a solar junction box with cost-effective design for replacement of a solar module when the solar junction box becomes defective, as well as flexibility to adapt the solar module to various output coupling wiring specifications.

SUMMARY OF THE DISCLOSURE

Embodiments of the present disclosure are directed to a universal junction box for solar modules that comprises multiple sub-assemblies with a replaceable diode black and an open-IP plug sub-assembly. The universal junction box includes a first sub-assembly (junction box platform), a second sub-assembly (a replaceable diode block), and a third sub-assembly (an open sub-assembly or plug sub-assembly. If the electronics in the diode block become defective, a new replaceable diode block can be used to substitute into the defective diode black without having to replace the entire junction box. The open-IP plug sub-assembly provides the flexibility to couple a variety of cable sub-assembly or IMEs to the universal junction box, as long as a particular selected cable sub-assembly fits with the dimension of the open-IP plug sub-assembly.

Broadly stated, a universal solar module box mounted on a solar module, comprising a junction box platform having a base plate, a blade block, and a cover; a modular diode block coupled electrically and mechanically to the junction box platform via the blade block; and a plug sub-assembly having a plug block and a cable block, attachable to the junction box platform and the modular diode block, the plug sub-assembly providing a protective covering to weatherize the diode block, the blade block, and the cable block, the cable block attachable mechanically to the plug block, the cable block securing mechanically and electrically to one or more output cables.

Advantageously, the claimed disclosure provides a universal junction box design that has an open-IP plug sub-assembly suitable for coupling with different types of cable assemblies, thereby reducing the costs and the necessity to have different types of junction box designs specific to a particular cable assembly specification. The claimed disclosure also provides the flexibility to couple to various IME components regardless of the functionality and size of the IME. In addition, the claimed disclosure provides a universal junction box design that minimizes or avoids the solar module manufacturers from liability or warranty claims.

The structure and methods of the present invention are disclosed in the detailed description below. This summary does not purport to define the invention. The present invention contains different embodiments, which may be applied to various different environments. Variations upon and modifications to these embodiments are provided for by the present invention, which is limited only by the claims. These and other embodiments, features, aspects, and advantages of the invention are better understood with regard to the following description, appended claims, and accompanying drawings.

BRIEF DESCRIPTION OF THE DRAWINGS

The disclosure is described with respect to specific embodiment thereof, and reference will be made to the drawing, in which:

FIG. 1A is a structural diagram illustrating a first embodiment of a universal solar junction box in a first perspective, which is attached to a solar panel for providing electrical connections to the solar panel and providing placement of electronics inside the universal solar junction box, in accordance with the present invention; and FIG. 1B is a structural diagram illustrating the constituents of the universal solar junction box in the first embodiment with three sub-assemblies (the junction box platform, the diode block, and the open-IP plug sub-assembly), in accordance with the present invention.

FIG. 8 is a structural diagram illustrating the junction box platform (the first sub-assembly), the diode block (the second sub-assembly), and the open-IP plug sub-assembly (the third sub-assembly) coupled with a cable sub-assembly, in accordance with the present invention.

FIG. 9A is a structural diagram illustrating a first perspective of a base plate, a diode block, and a output cable sub-assembly, in accordance with the present invention; FIG. 9B is a structural diagram illustrating a second perspective of a base plate, a diode block, and a output cable sub-assembly, in accordance with the present invention; and FIG. 9C is a structural diagram illustrating a base plate, a diode block, and a box cover with one or more connectors, and one or more wires, in accordance with the present invention.

FIG. 14A is a structural diagram illustrating an embodiment of the universal solar junction box attached to a solar module frame the solar module in accordance with the present invention; and 14B, 14C are additional structural diagrams illustrating the universal solar junction box in accordance with the present invention.

DETAILED DESCRIPTION

Figure 2A:
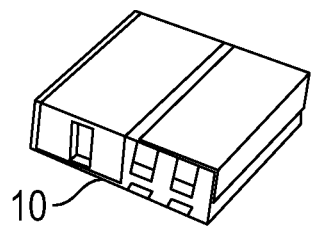
FIG. 2A is a structural diagram illustrating the first embodiment of a universal solar junction box in a second perspective, which is attached to a solar panel for providing electrical connections to the solar panel and providing placement of electronics inside the universal solar junction box, in accordance with the present invention.

A description of structural embodiments and methods of the present invention is provided with reference to FIGS. 1A-18. It is to be understood that there is no intention to limit the invention to the specifically disclosed embodiments but that the invention may be practiced using other features, elements, methods, and embodiments. Like elements in various embodiments are commonly referred to with like reference numerals. In the following description, for purposes of explanation, numerous specific details are set forth in order to provide an understanding of various embodiments of the inventive subject matter. It will be evident to those skilled in the art, however, that embodiments of the inventive subject matter may be practiced without these specific details. In general, well-known instruction instances, protocols, structures, and techniques have not been shown in detail.

The following definitions apply to the elements and steps described herein. These terms may likewise be expanded upon.

Figure 17:
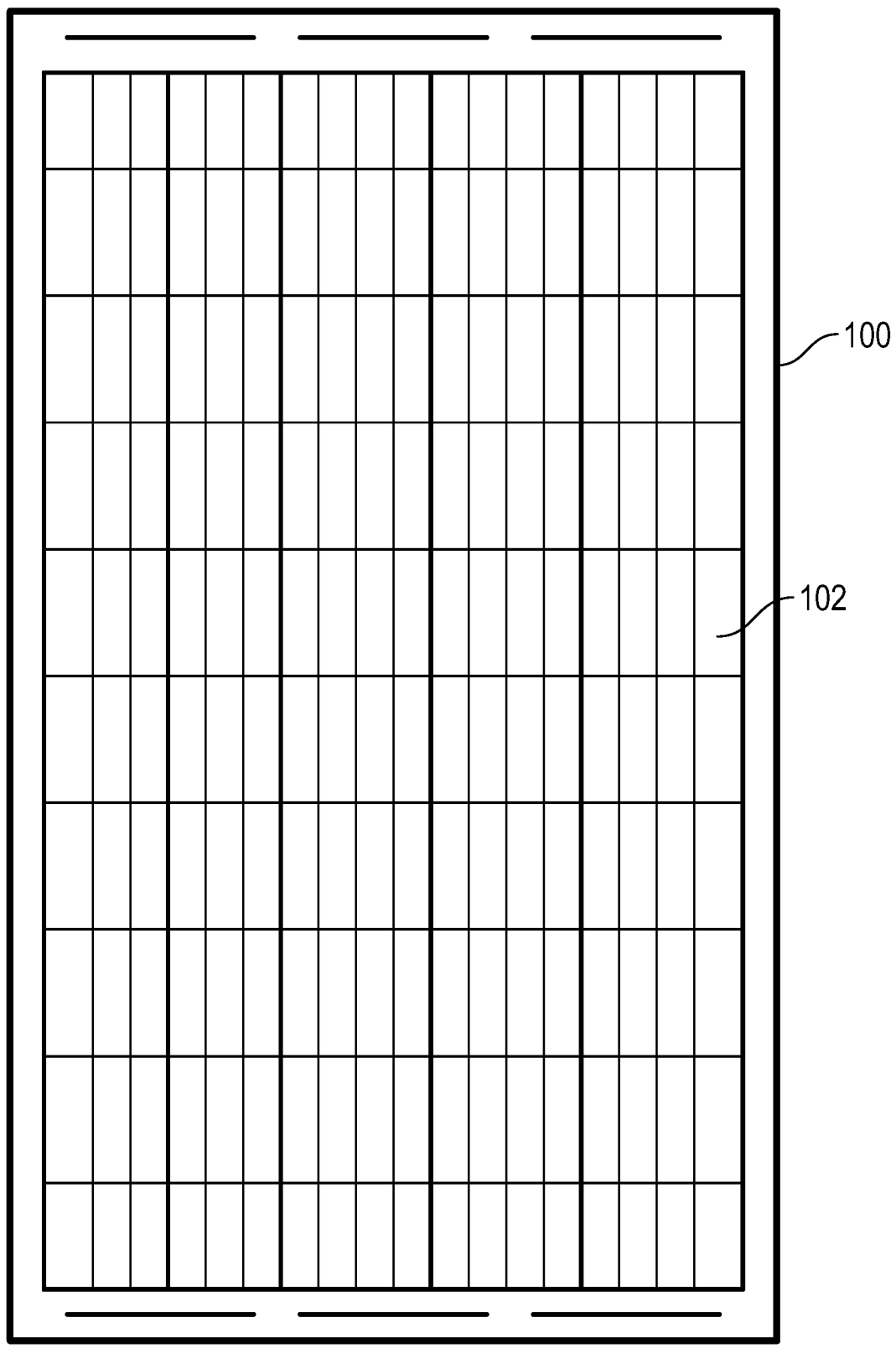
FIG. 17 is a structural diagram illustrating a sample solar module with a front surface of solar cells, in accordance with the present invention.
Figure 18:
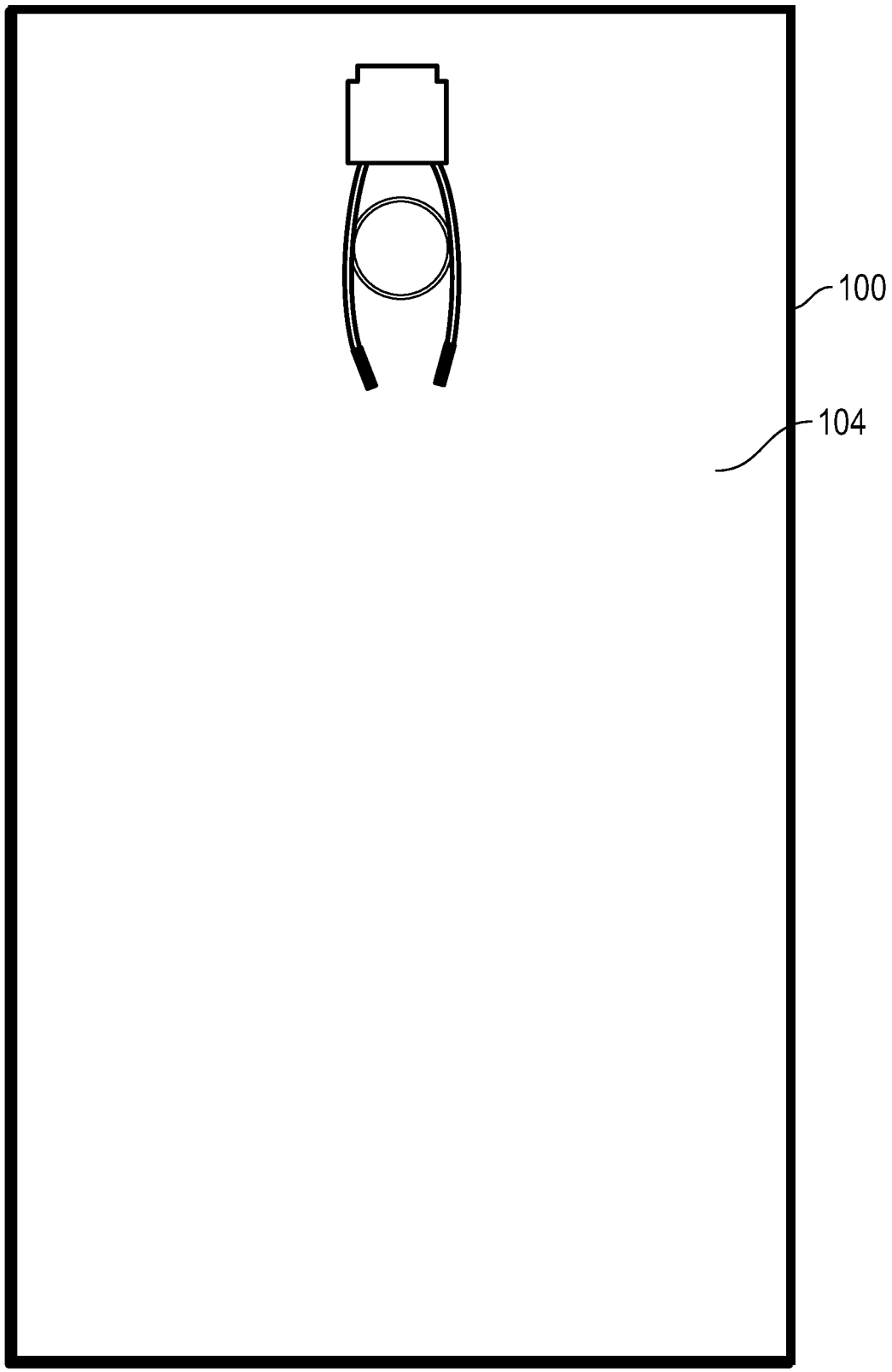
FIG. 18 is a structural diagram illustrating a sample solar module with a back surface of solar cells, in accordance with the present invention.

FIG. 1A is a structural diagram illustrating a universal solar junction box 10, which is attached to a solar panel 100 for providing electrical connections to the solar panel and for providing placement of electronics inside the universal solar junction box 10. The main constituents (or parts) of the universal solar junction box 10 are depicted in FIG. 1B. The universal solar junction box 10 includes three main sub-assemblies: a junction box platform 20 (also referred to as "a first sub-assembly"), a diode block 30 (also referred to as "a diode sub-assembly" or "a second sub-assembly"), and a plug sub-assembly 40 (also referred to as "an open-IP sub-assembly" or "an open-IP plug sub-assembly" or "a third sub-assembly"). In the first sub-assembly 10, the junction box platform 20 includes a base plate 50, a blade block 60, and a cover 70 for covering over a cavity 55 of the base plate 50. The diode block 30 or the second sub-assembly 30 includes one or more diodes for controlling the electrical current supplied to the universal solar junction box 10, and thus serves to prevent short circuiting in the associated solar panel. In the third sub-assembly 40, the open-IP plug sub-assembly includes a plug block 80 and a cable block 90. A sample solar panel 100 is illustrated on FIGS. 17 and 18, with the front side 102 of the solar panel as shown in FIG. 17 and the back side 104 of the solar panel as shown in FIG. 18.

Figure 2B:
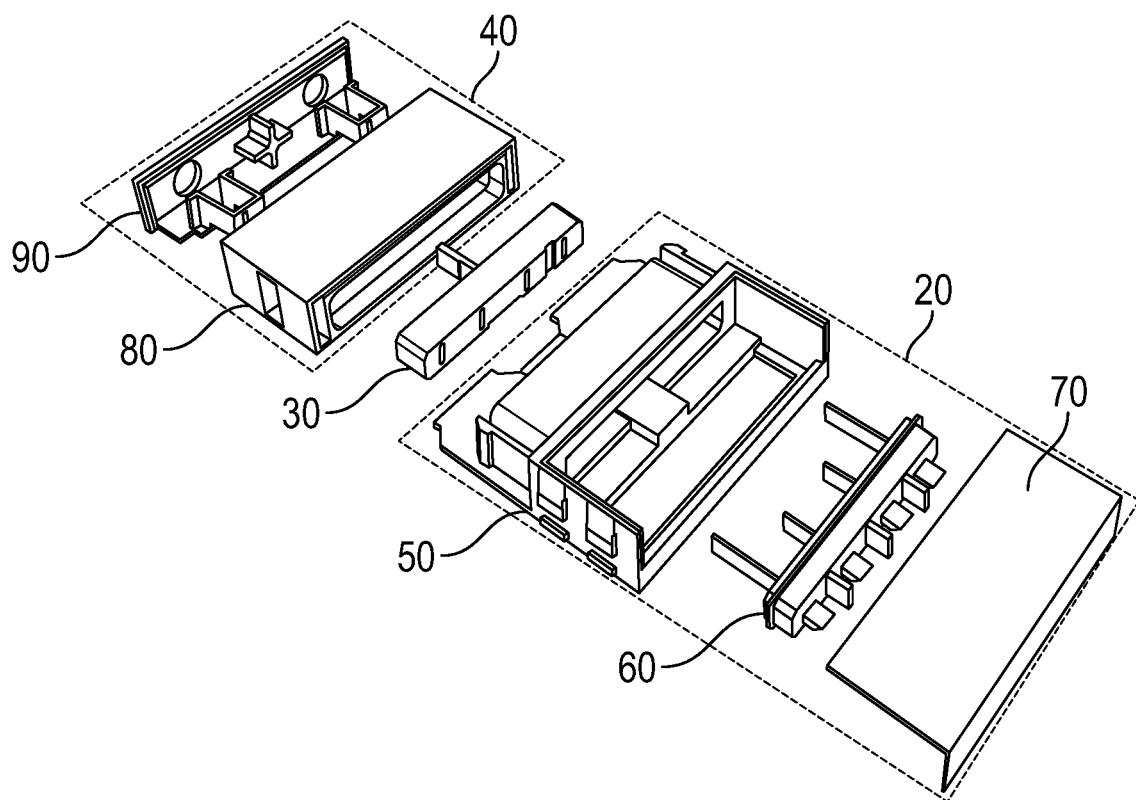
FIG. 2B is a structural diagram illustrating the constituents of the universal solar junction box in the second perspective with three sub-assemblies assemblies (the junction box platform, the diode block, and the open-IP plug sub-assembly), in accordance with the present invention.

FIG. 2A is a structural diagram illustrating the first embodiment of a universal solar junction box in a second perspective, which is attached to a solar panel for providing electrical connections to the solar panel and providing placement of electronics inside the universal solar junction box. FIG. 2B is a structural diagram illustrating the constituents of the universal solar junction box in the second perspective with three sub-assemblies assemblies: the junction box platform, the diode block, and the open-IP plug sub-assembly. The universal solar junction box 10 includes the junction box platform 20, which can be coupled to the diode block 30, which in turn can be coupled to the plug sub-assembly 40. In the first sub-assembly 10, the junction box platform 20 comprises the blade block 60, which can be inserted and coupled (or attached) to the base plate 50 with the cover for base plate 70. The diode block 30 or the second sub-assembly 30 includes one or more diodes for controlling the electrical current supplied to the universal solar junction box 10, and thus serves to prevent short circuiting in the associated solar panel. In the third sub-assembly 40, the open-IP plug sub-assembly includes the plug block 80 and the cable block 90.

Figure 3:
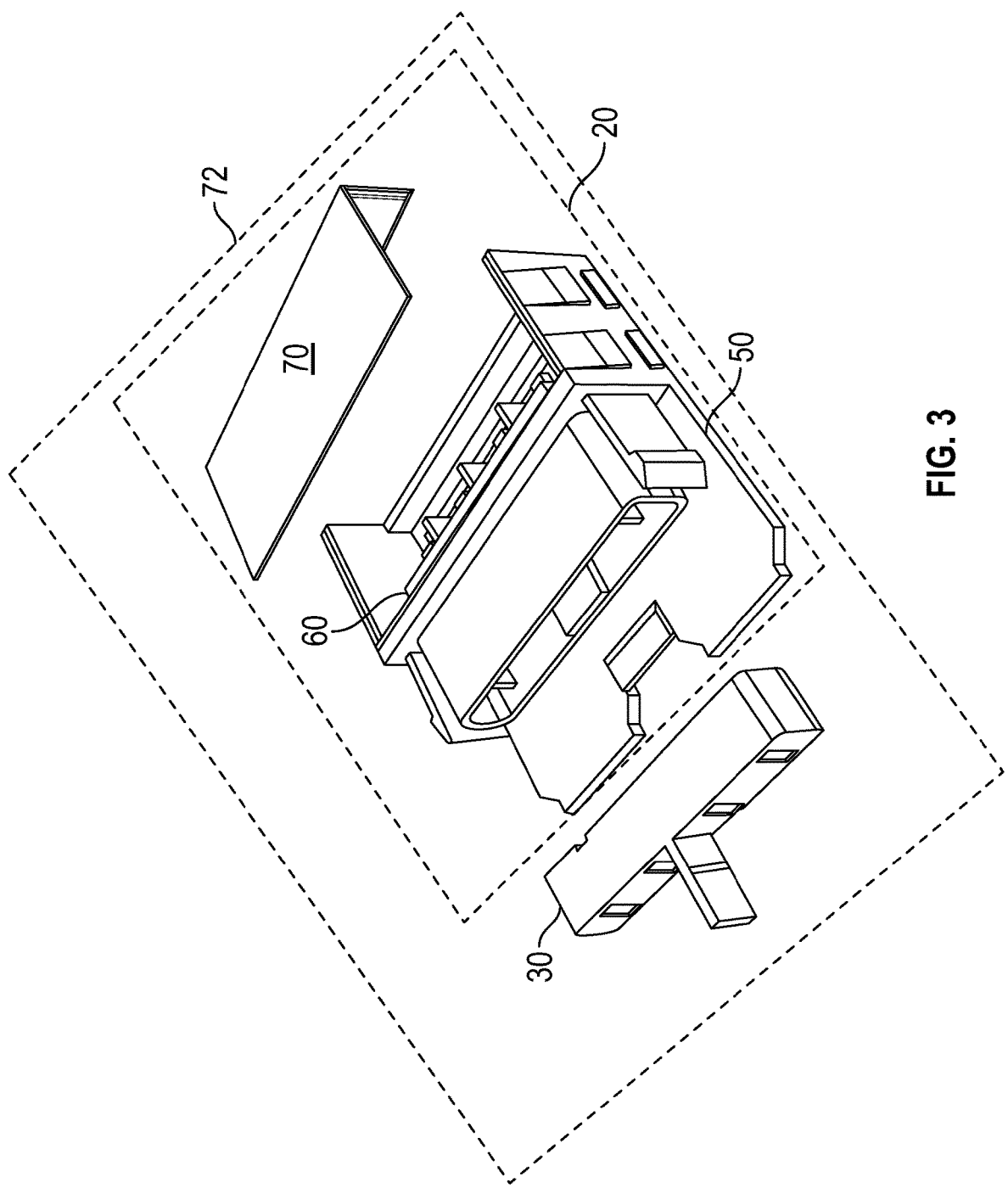
FIG. 3 is a structural diagram illustrating the constituents of the junction box platform and the diode block, in accordance with the present invention.

FIG. 3 is a structural diagram illustrating the constituents of the junction box platform 20 and the diode block 30. The blade block 60 is inserted into the base plate 50, with the cover 70, for coupling (or attaching) to the diode block 30. A combined sub-assembly of the junction box platform 20 and the diode block 30, collectively, are referred to as a junction box/diode block sub-assembly 72.

Figure 4:
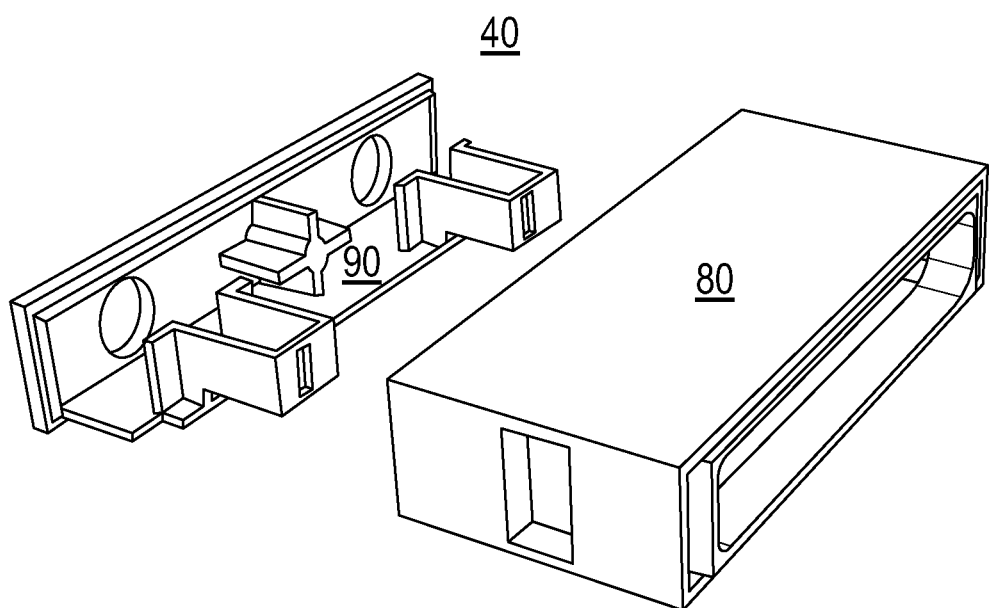
FIG. 4 is a structural diagram illustrating the constituents of the open-IP plug sub-assembly, in accordance with the present invention.

FIG. 4 is a structural diagram illustrating the constituents of the open-IP plug sub-assembly 40, which includes the plug block 80 and the cable block 90. The concept of the open-IP plug sub-assembly is to provide a greater flexibility to manufacturers that have different specifications for plugging into the universal solar junction box 10. The various manufactures may have a block to mount onto the universal solar junction box 10, such as a micro inverter or solar module optimization box, as well as different number of cables, such as one cable (like an AC wire), two cables, four cables, etc. A manufacture can provide an inverter box for mounting onto the frame of the solar panel 100, and connectable to the open-IP plug sub-assembly 40, for converting direct current (DC) to alternating current (AC) to the solar module 100. A manufacturer can provide the solar module optimization box, to mount the open-IP plug sub-assembly 40, as a mechanism to monitor the solar module 100 and make adjustments to optimize the efficiency of the solar module 100 (or a plurality of solar modules). The concept of the open-IP plug sub-assembly is to provide a common interface (or platform) for various manufacturers that offers the flexibility to tailor their block (e.g., electrical/mechanical block with one or more wires) that is pluggable to the open-IP plug sub-assembly 40. Without the common interface, a solar module will have to provide a wide range of product lines to fit and operate with each external communication box to the solar module. The cable block 90 has one or more open gaps for wires or cables to extend between the inside and outside of the cable block 90. In an alternate embodiment, the inverter or the solar module optimization box can be integrated into the open-IP sub-assembly 40.

Figure 5:
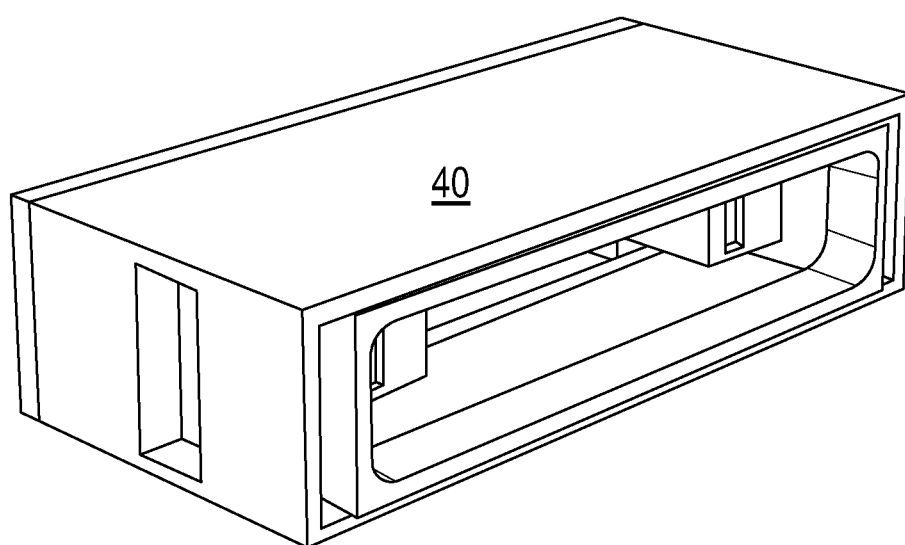
FIG. 5 is a structural diagram illustrating the open-IP plug sub-assembly, in accordance with the present invention.

After inserting the cable block into the plug block 80 in the open-IPB sub-assembly 40, the resulting combination of the open-IP plug sub-assembly is shown in FIG. 5.

Figure 6:
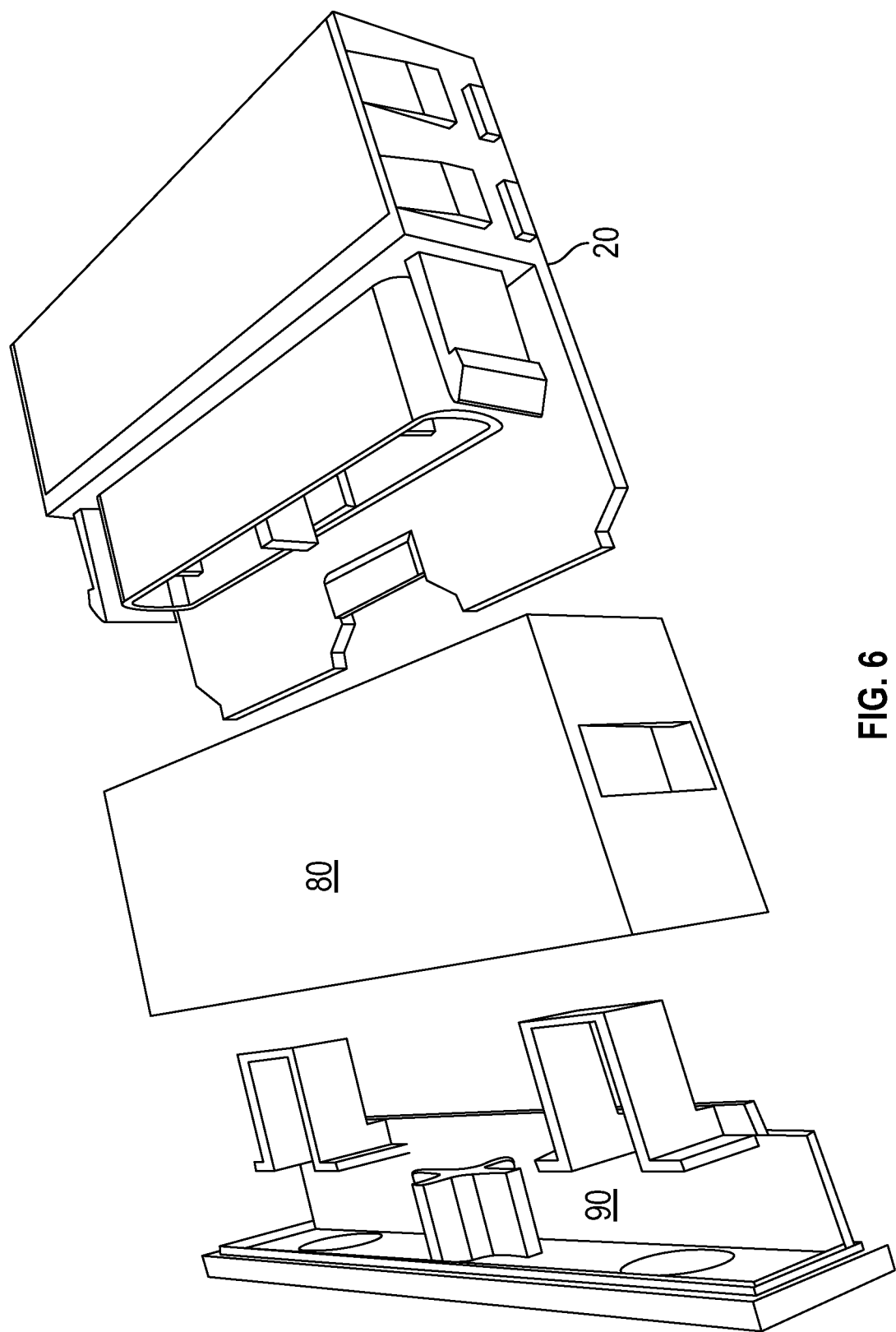
FIG. 6 is a structural diagram illustrating a combined sub-assembly of the junction box platform with the diode block, plug block, and cable block, in accordance with the present invention.

FIG. 6 is a structural diagram illustrating a combined sub-assembly of the junction box platform 20 with the diode block, the plug block 80, and the cable block 90. The junction box platform 20 (or the first sub-assembly) has assembled the base plate 50, the blade 60, and the cover 70 into one sub-assembly. The diode block 30 (or the second sub-assembly) is not shown in this figure. On the other end, the open-IP sub-assembly (or the third sub-assembly) is illustrated with the plug block 80 and the cable block 90.

Figure 7:
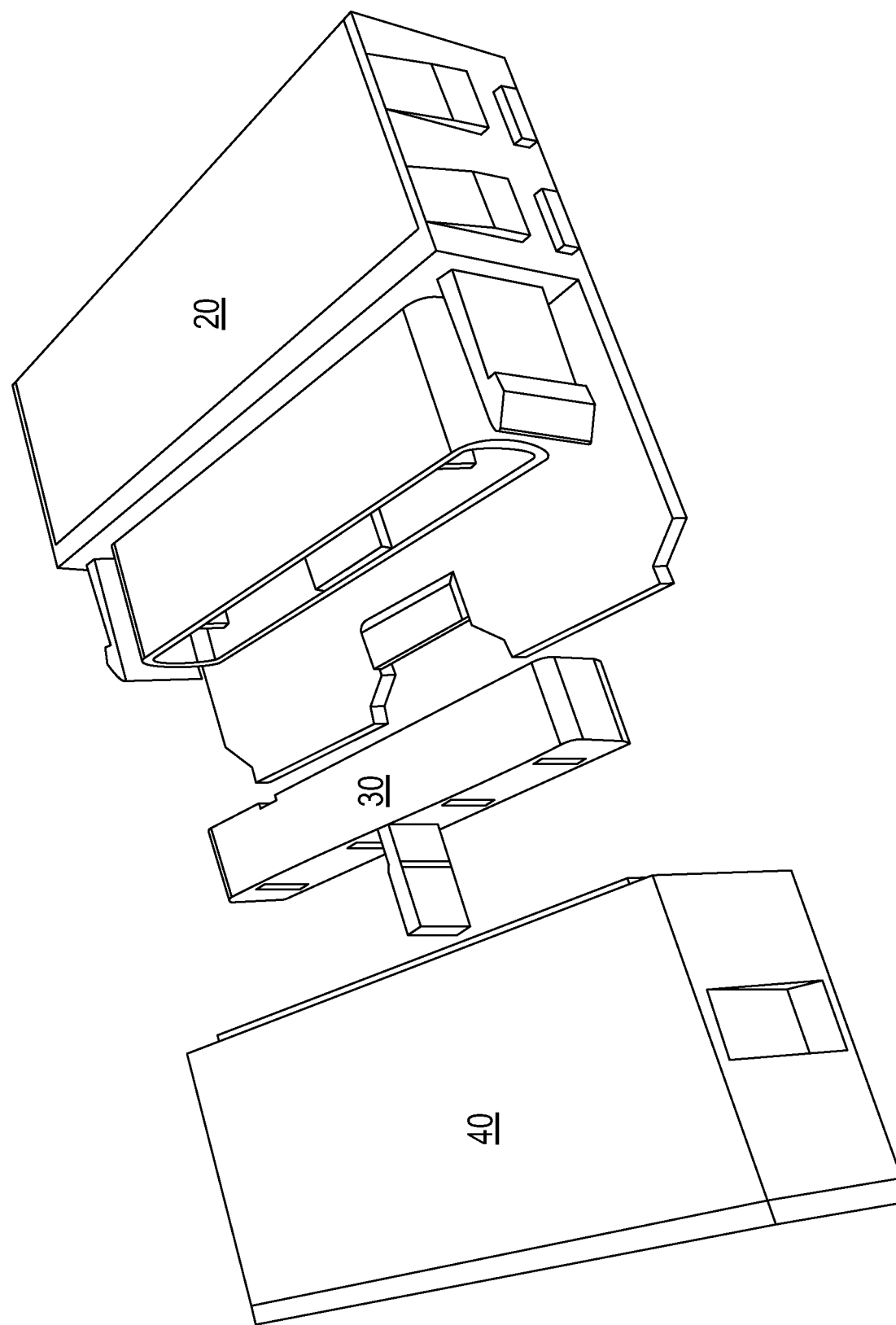
FIG. 7 is a structural diagram illustrating the junction box platform (the first sub-assembly), the diode block (the second sub-assembly), and the open-IP plug sub-assembly (the third sub-assembly), in accordance with the present invention.

FIG. 7 is a structural diagram illustrating the junction box platform 20 (the first sub-assembly), the diode block (the second sub-assembly), and the open-IP plug sub-assembly 40 (the third sub-assembly). The junction box platform 20 has been assembled into one sub-assembly in this figure to include the base plate 50, the blade 60, and the cover 70. The open-IP sub-assembly 40 has been assembled into one sub-assembly in this figure to include the plug block 80 and the cable block 90. The diode block 30 ("the replaceable diode block"), which is a modular unit that can be removed and singularly replace the defective diode block 30, rather than the entire solar junction box 10, is shown to be placed between the junction box platform 20 and the open-IP sub-assembly 40.

FIG. 8 is a structural diagram illustrating the junction box platform 20 (the first sub-assembly), the diode block 30 (the second sub-assembly), and the open-IP plug sub-assembly 40 (the third sub-assembly) coupled with a cable sub-assembly 92. The cable sub-assembly 92 plugs into the cable block 80 and the plug block 90 in the open-IP plug sub-assembly 40. In one embodiment, the cable sub-assembly 92 has a pair of cables that serve the solar module output with positive polarity and negative polarity. The cables or wires in the cable sub-assembly 92 are also replaceable and can be removed or unplugged from the open-IP sub-assembly for replacement, servicing, or testing of functions. After servicing or testing, the existing cable sub-assembly 92, if the part is operational, a new cable sub-assembly 92, is plugged back in to the cable sub-assembly 92. In another embodiment, the cables on the cable sub-assembly 92 can be one or more DC cables or AC cables that operate as one or more microconverters used to convert DC power to AC power. The cable sub-assembly 92 can be constructed from various embodiments to tailor to a specific device that will be plugged into the universal solar junction box 10.

FIG. 9A is a structural diagram illustrating a first perspective of the base plate 50, the replaceable diode block 30, and an output cable sub-assembly 94. In one embodiment, the base plate 50 is attached to the backside of the solar module 100. As an example of attachment, the base plate 50 is glued to the backside of the solar module 100. Other attaching methods of the base plate 50 to the solar module 100 are without departing from the spirits of the present disclosure. The output cable sub-assembly 94 includes the open-IP sub-assembly and one or more cables 92. FIG. 9B shows another perspective of the same components of the base plate 50, the replaceable diode block 30, and the output cable sub-assembly 94. FIG. 9C is a structural diagram illustrating the base plate 50 with a cage 46, the replaceable diode block 30, and the output cable sub-assembly 94 with a box cover 96. The box cover 96 can be placed over the cage 46 for assembling the base plate 50, the replaceable diode block 30, and the output cable sub-assembly 94.

Figure 10B:
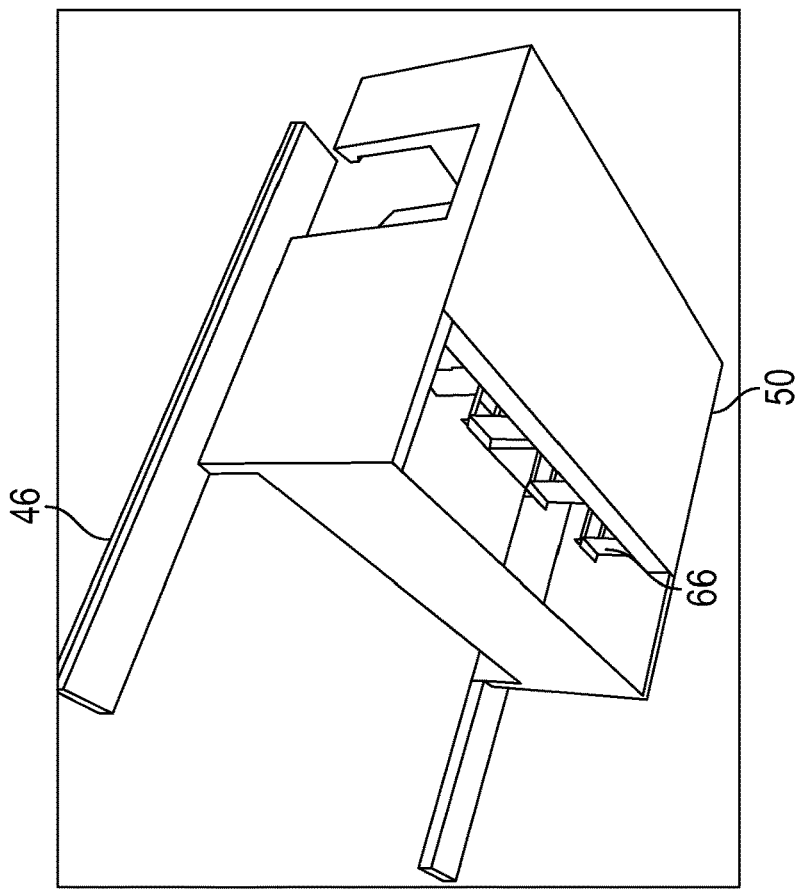
FIG. 10B is a structural diagram illustrating a vertical embodiment of one or more locking latches for affixing with the diode block, in accordance with the present invention.
Figure 10A:
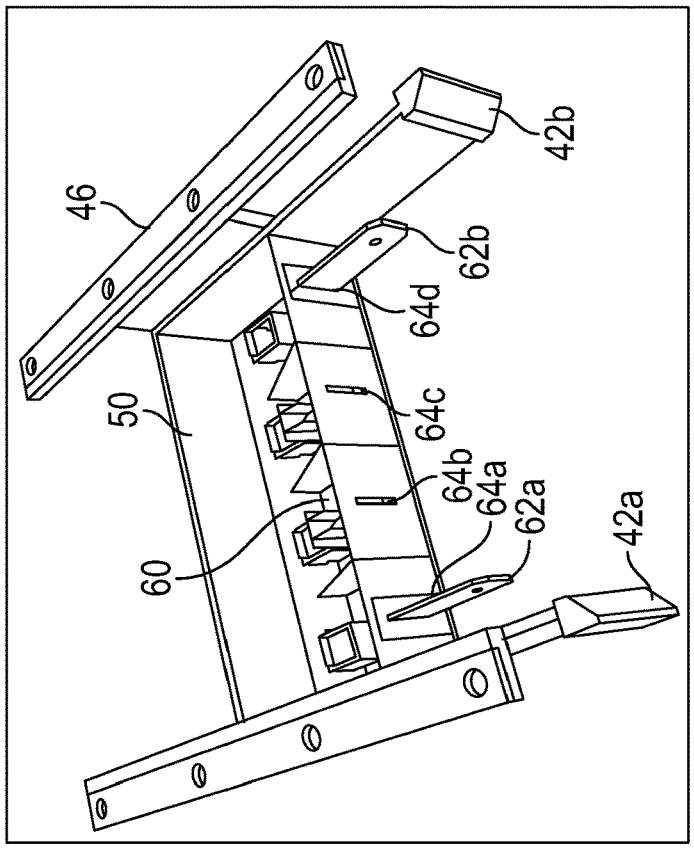
FIG. 10A is a structural diagram illustrating a horizontal embodiment of one or more locking latches for affixing with the blade block, in accordance with the present invention.

FIG. 10A is a structural diagram illustrating a horizontal embodiment of one or more locking latches 42a and 42b for affixing with the blade block 60. The base plate 50 is attached (such as glued) to the frame module and affixed (such as screwed) to the module frame 100 for additional strength to allow larger IME to be plugged. For example, the IME includes electronics such as inverters, DC-DC optimizers, etc. Optionally, an aluminum bar can also be inserted as part of the cage 46 for grounding. The blade block 60 extends through one or more slots 64*a*, 64*b*, 64*c*, and 64*d* in the base plate 50 one or more electrical conducting blades 32*a* and 32*b*. Each of the electrical conducting blades 32*a* and 32*b* is inserted through a corresponding one of the slots 64*a* and 64*b*. Alternatively, a vertical embodiment with one or more locking latches for affixing with a vertical blade block 66 is illustrated in FIG. 10B.

Figure 11A:
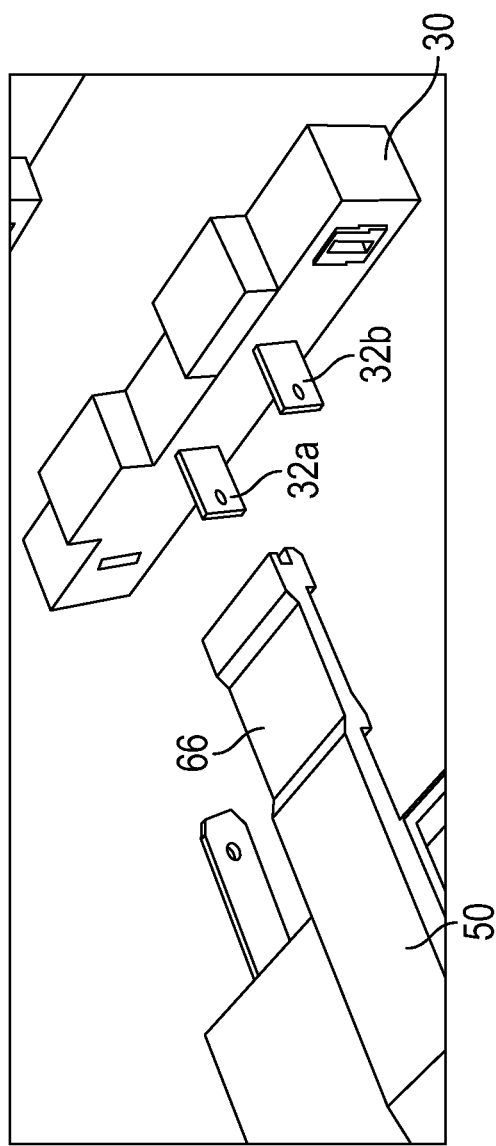
FIG. 11A is a structural diagram illustrating the vertical locking latch embodiment for affixing with the diode block, in accordance with the present invention.

FIG. 11A is a structural diagram illustrating the vertical locking latch embodiment for affixing with the replaceable diode block 30. The replaceable diode block 30 includes one or more blade connectors 32*a* and 32*b* for plugging into the base plate 50. When the diode block 30 becomes defective, it can be easily unplugged from the based plate 40 and replaced with a new diode block 30. The modularity of the replaceable diode block 30 mitigates the expensive and cumbersome approach of having to replace the entire sole module when one of the diodes, which is sealed to a solar junction box, becomes defective. The reliability and life cycle of a diode can be a weak point in the solar module. If one of the diodes in a traditional sealed diode block is short circuited, the solution is relatively expensive in having to replace the entire solar module instead of just a diode block.

Figure 11B:
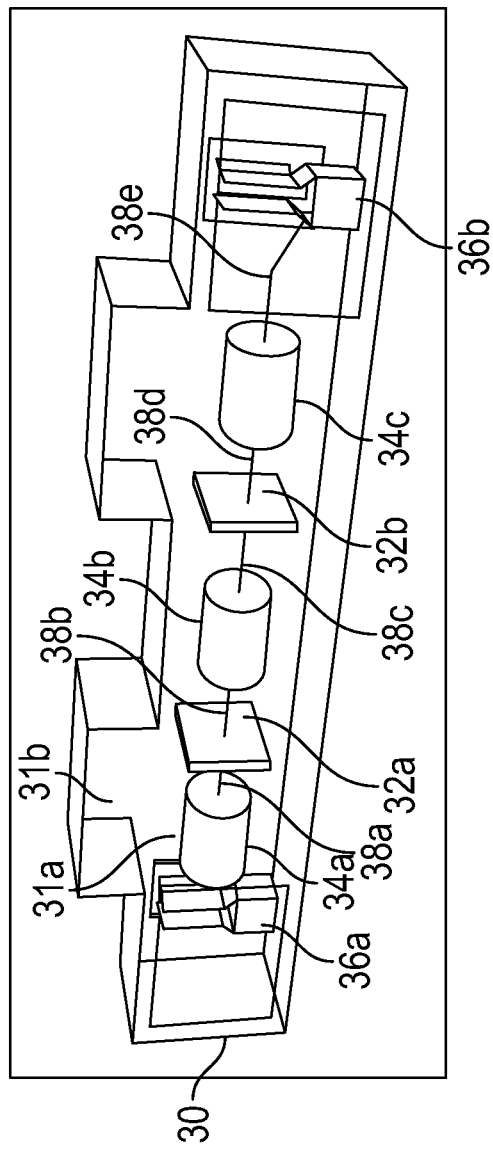
FIG. 11B is a structural diagram illustrating the diode block with spring connectors for receiving and affixing to vertical locking latches, in accordance with the present invention.

FIG. 11B is a structural diagram illustrating the replaceable diode block 30 with spring connectors 36*a* and 36*b* for receiving and affixing to vertical locking latches 66. In this embodiment, the replaceable diode block 30 includes three diodes 34*a*, 34*b*, and 34*c*, that are pre-assembled in one block, as well as spring connectors 36*a* and 36*b*, electrical conducting blade connectors 32*a* and 32*b*, and on or more wires 38. The spring connector 36*a* is electrically connected to the diode 34*a* via a wire, which is electrically connected to the electrical conducting blade connection 32*a* via a wire 38*a*, which is electrically connected to the diode 34*a* via a wire 38*b*, which is electrically connected to the electrically conducting blade connector 32 via a wire 38*c*, which is electrically connected to the diode 34*c* via a wire 38*d*, and which is electrically connected to the spring connector 36*b* via a wire 38*e*. Each of the diodes 34*a*, 34*b*, and 34*c* produce heat when active. The replaceable diode block 30 can include an optional heat dissipating silicon 31*a* within a cavity 31*b* of the replaceable diode block 30, thereby reducing, or preventing overheating caused to one of the diodes. The heat dissipating silicon 31*a* can be filled throughout the entire cavity 31*b* of the replaceable diode block 30, or surrounding the exterior areas of the diodes 34*a*, 34*b*, and 34*c*. Other types of heat dissipating materials that are suitable to operate with diodes can also be used.

Figure 12B:
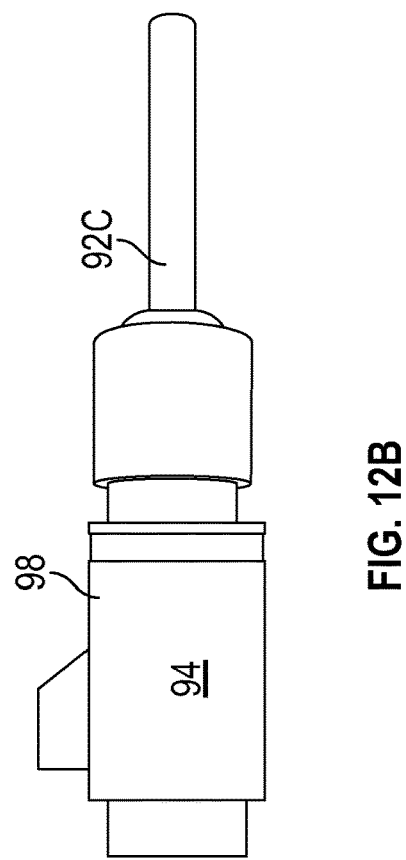
FIG. 12B is a structural diagram illustrating a second embodiment of the output cable sub-assembly with a single wire, in accordance with the present invention.
Figure 12A:
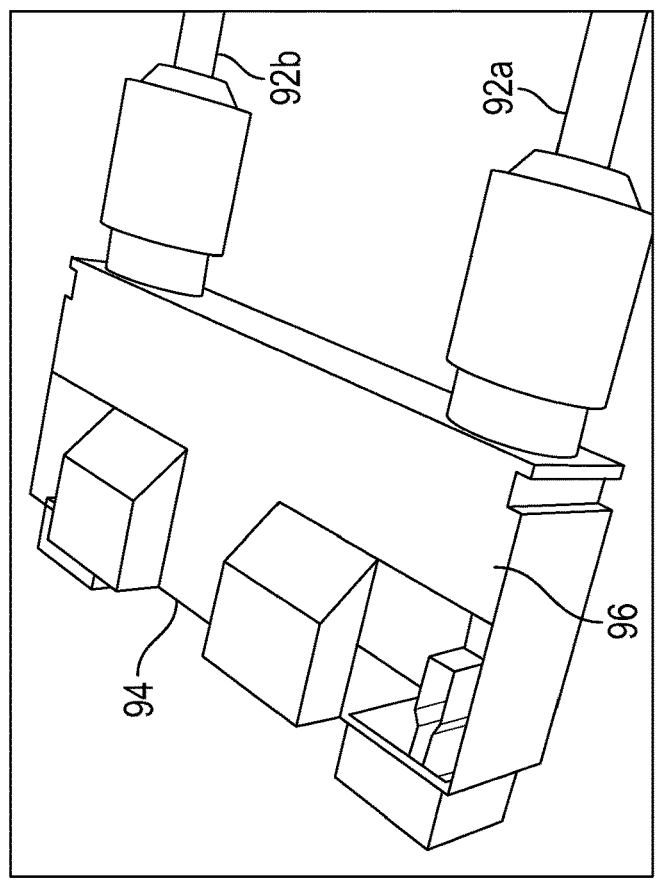
FIG. 12A is a structural diagram illustrating a first embodiment of the output cable sub-assembly with a pair of wires, in accordance with the present invention.

FIG. 12A is a structural diagram illustrating a first embodiment of the output cable sub-assembly 94 with a cover 96 for attaching to a pair of wires 92*a* and 92*b*. The cover 96 in the output cable sub-assembly 94 can be used to mechanically and electrically coupled to operate with any types of IMEs to service their customers. One benefit from this type of design is the allocation of warranties. While a first company, such as JA Solar, provides a solar module, including a junction box, and the associated warranty for the solar module, the second company who provides an IME for coupling to the cover 96 of the output cable sub-assembly 94 would provide the warranty for that portion of the electronics and part. This effectively reduces the warranty exposure and liability of the solar module company. In an alternative embodiment, FIG. 12B is a structural diagram illustrating a second embodiment of the output cable sub-assembly with a single wire 92*c* that is mechanically and electrically coupled to the cover of the output 98 cable sub-assembly 94.

Figure 13B:
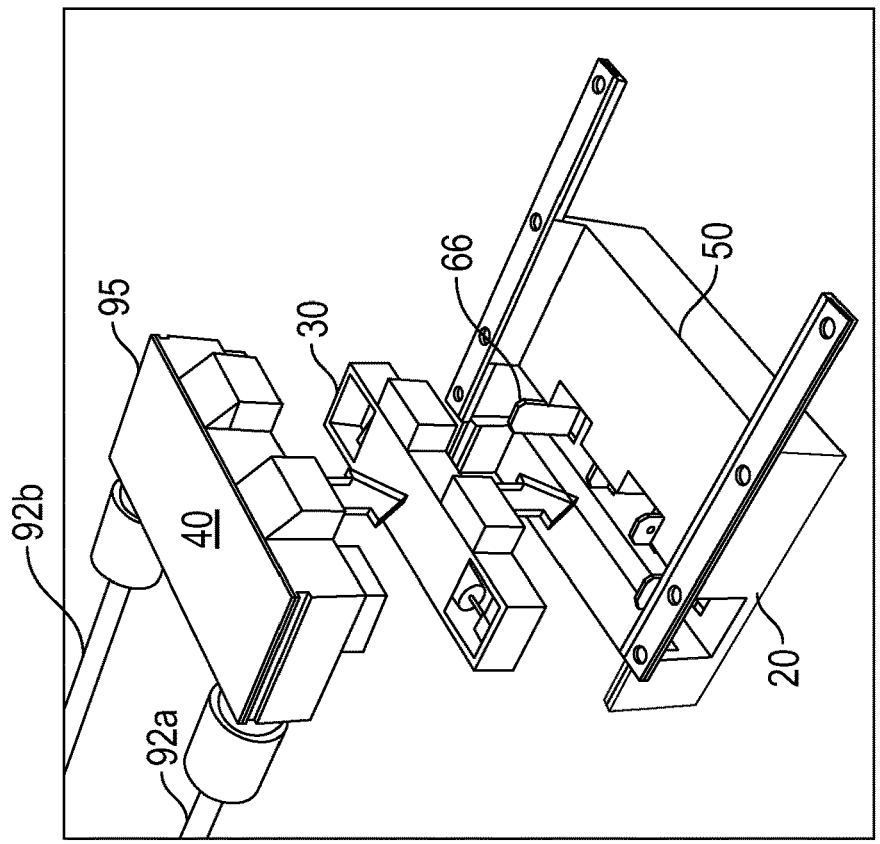
FIG. 13B is a structural diagram illustrating a vertical assembly embodiment with the junction box platform, the diode block, and the open-IP plug sub-assembly, in accordance with the present invention.
Figure 13A:
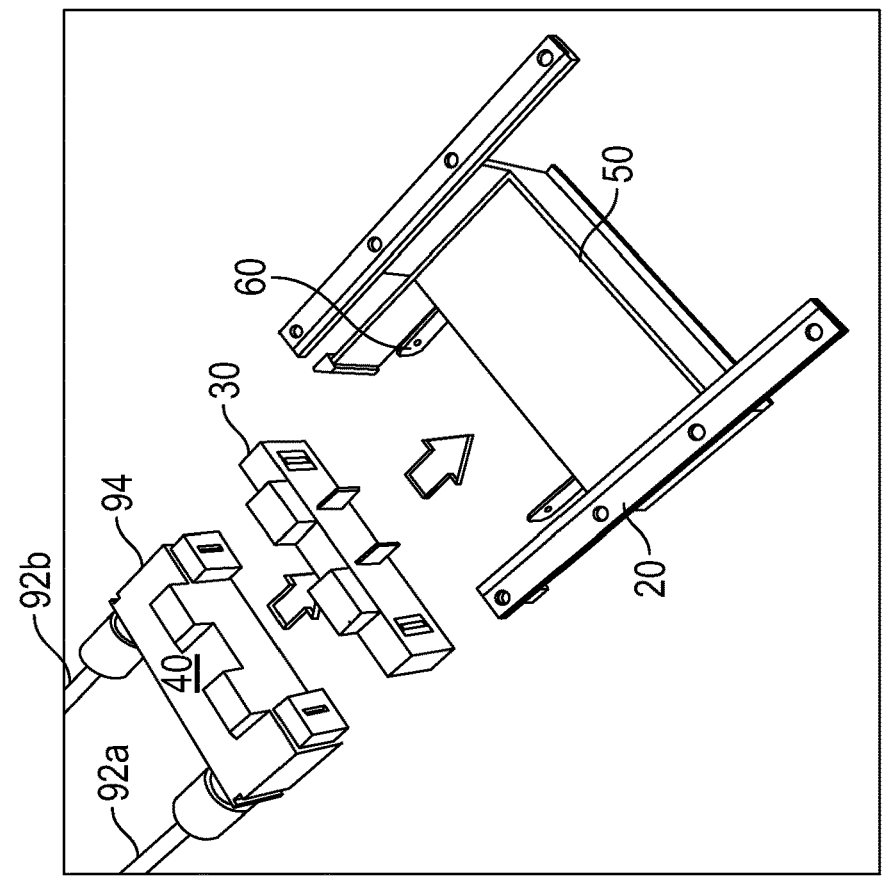
FIG. 13A is a structural diagram illustrating a horizontal assembly embodiment with the junction box platform, the diode block, and the open-IP plug sub-assembly, in accordance with the present invention.

FIG. 13A is a structural diagram illustrating a horizontal assembly embodiment with the junction box platform 20, the diode block 30, and the output cable sub-assembly 94 (or open-IP plug sub-assembly 40 with the pair of cables 92*a* and 92*b*). In this horizontal assembly embodiment, the junction box platform 20 includes the horizontal blade block 60, which has one or more horizontal blades that extend horizontally to the replaceable diode block 30. The open-IP plug sub-assembly 40 also has a horizontal construction for coupling to the replaceable diode block 30. FIG. 13B is a structural diagram illustrating a vertical assembly embodiment with the junction box platform 20, the diode block 30, and the output cable sub-assembly 95 (or the open-IP plug sub-assembly 40 and the pair of cables 92*a* and 92*b*). In this vertical assembly embodiment, the junction box platform 20 includes the vertical blade block 66, which has one or more vertical blades that extend vertical to the replaceable diode block 30. The open-IP plug sub-assembly 40 also has a vertical construction for coupling to the replaceable diode block 30.

Figure 15:
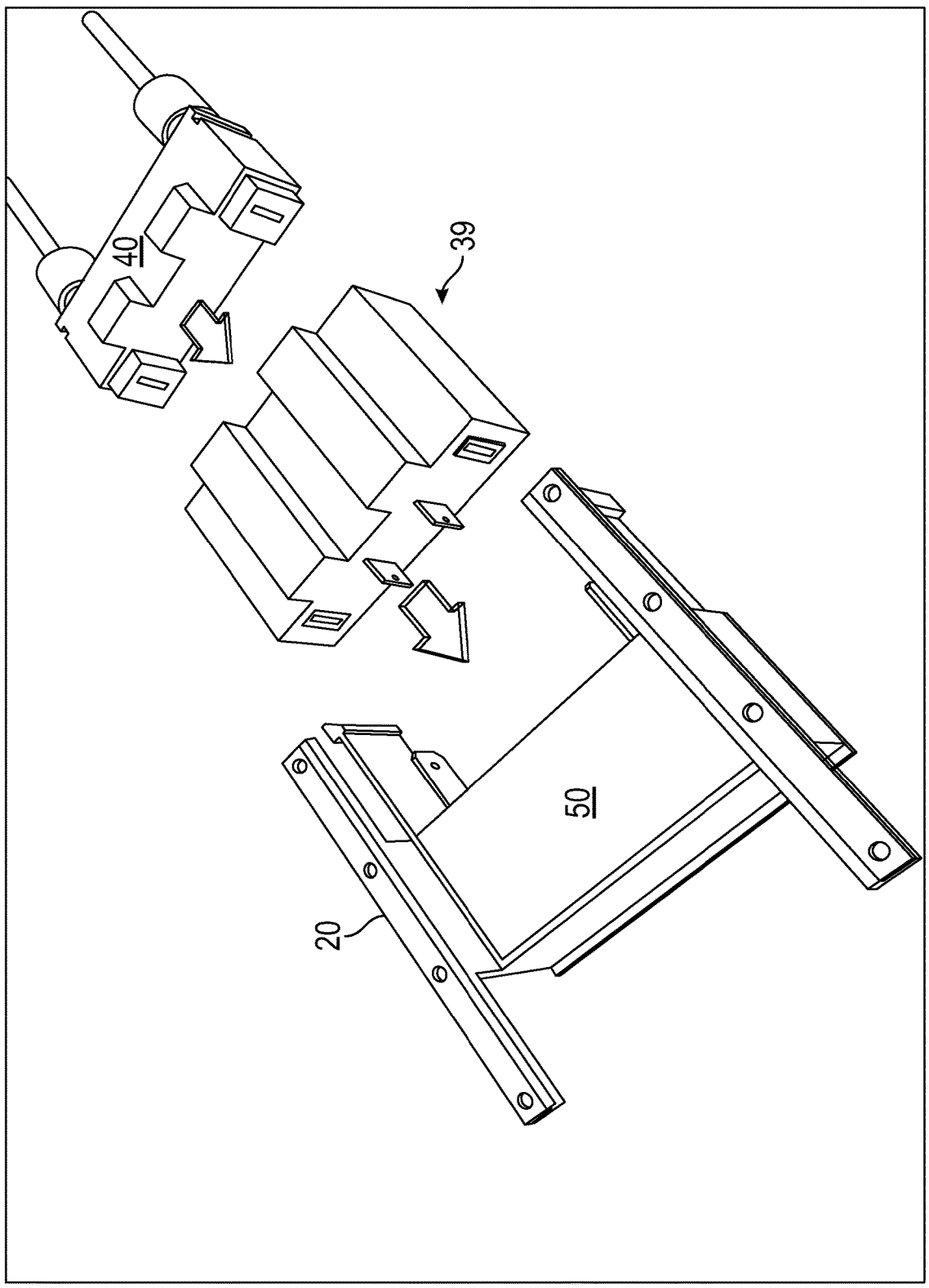
FIG. 15 is a structural diagram illustrating a second embodiment of the universal solar junction box with a DC-to-DC optimizer that can be plugged directly into the base plate without the diode, in accordance with the present invention.
Figure 16:
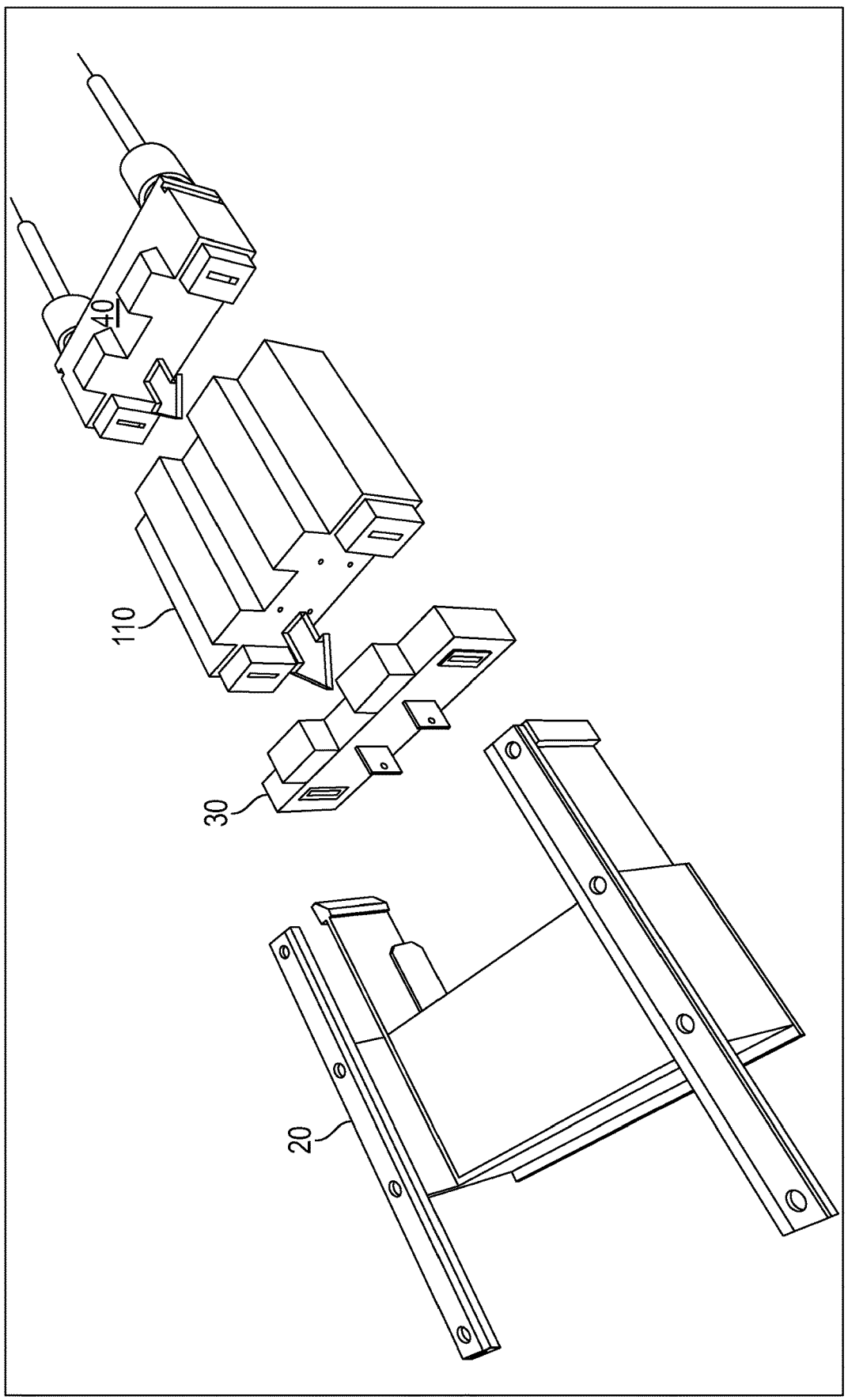
FIG. 16 is a structural diagram illustrating a third embodiment of the universal solar junction box with a micro-inverter that can be plugged directly into the diode block, in accordance with the present invention.

FIG. 14A is a structural diagram illustrating an embodiment of the universal solar junction box 10 attached to a solar module frame 106 of the solar module 100. Additional views of the universal solar junction box 10 are shown in FIGS. 14B, 14C. FIG. 15 is a structural diagram illustrating a second embodiment of the universal solar junction box 10 with a DC-to-DC optimizer 39 that can be plugged directly into the base plate 50 without the diode. Other alternative interface boxes can also be used in place of the DC-to-DC optimizer 39 or the replaceable diode block 30 for mechanically coupling between the junction box platform 20 and the open-IP sub-assembly. FIG. 16 is a structural diagram illustrating a third embodiment of the universal solar junction box 10 with a micro-inverter 110 that can be plugged directly into the replaceable diode block 30 and coupling between the junction box platform 20 and the open-IP sub-assembly.

Certain embodiments are described herein as including logic or a number of components, modules, or mechanisms. Modules may constitute either software modules (e.g., code and/or instructions embodied on a machine-readable medium or in a transmission signal) or hardware modules (or hardware units, or hardware circuits, depending on engineering implementation). A hardware module is a tangible unit capable of performing certain operations and may be configured or arranged in a certain manner. In example embodiments, one or more electronics (or computer systems) or one or more hardware modules of a computer system may be configured by software an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor 712 or other programmable processor) that is temporarily configured by software to perform certain operations. It will be appreciated that the decision to implement a hardware module mechanically, in dedicated and permanently, configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured to using software, the general-purpose processor may be configured as respective different hardware modules at different times. Software may accordingly configure a processor, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmission (e.g., over appropriate circuits and buses) that connect the modules. In the embodiments where multiple modules are configured or instantiated at different times, communications between such modules may be achieved. For example, communications may occur through the storage and retrieval of information in memory structures where the multiple modules have access. For example, one module may perform an operation and store the output of that operation in a memory device to which it is communicatively coupled. A further module may, at a later time, access the memory device to retrieve and process the stored output. Modules may also initiate communications with input or output devices, and can operate on a resource (e.g., a collection of information).

The various operations of example methods described herein may be performed, at least partially, by one or more processors that are temporarily configured (e.g., by software, code, and/or instructions stored in a machine-readable medium) or permanently configured to perform the relevant operations. Whether temporarily or permanently configured, such processors may constitute processor-implemented (or computer-implemented) modules that operate to perform one or more operations or functions. The modules referred to herein may, in some example embodiments, comprise processor-implemented (or computer-implemented) modules.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The terms "a" or "an," as used herein, are defined as one or more than one. The term "plurality," as used herein, is defined as two or more than two. The term "another," as used herein, is defined as at least a second or more.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and its practical applications, to thereby enable others skilled in the art to best utilize the embodiments and various embodiments with various modifications as are suited to the particular use contemplated.

What is claimed and desired to be secured by Letters Patent of the united states is:

1. A universal solar module box mounted on a solar module, comprising:
   a junction box platform having a base plate, a blade block, and a cover;
   a singular modular diode block coupled electrically and mechanically to the junction box platform via the blade block, the singular modular diode block serving as a replaceable modular unit; and
   a plug sub-assembly having a plug block and a cable block, attachable to the junction box platform and the singular modular diode block, the plug sub-assembly providing a protective covering to weatherize the singular modular diode block, the blade block, and the cable block, the cable block attachable mechanically to the plug block, the cable block securing mechanically and electrically to one or more output cables.

2. The universal solar module box of claim 1, wherein the singular modular diode block comprises a plurality of diodes, the singular modular diode block being a replaceable component when one of the diodes in the singular modular diode block fails.

3. The universal solar module box of claim 1, wherein the singular modulator diode block comprises three diodes for protecting a plurality solar cells on the solar module.

4. The universal solar module box of claim 3, wherein the three diodes are connected in series and wherein the singular modular diode block comprises:
   a first connector for establishing a first external connection of the singular modular diode block, the first connector being coupled to one end of a series connection of the three diodes; and
   a second connector for establishing a second external connection of the singular modular diode block, the second connector being coupled to the other end of the series connection of the three diodes.

5. The universal solar module box of claim 1, wherein the plug sub-assembly is coupled to one or more cables.

6. The universal apparatus of claim 1, wherein the plug sub-assembly is coupled to a single cable.

7. The universal solar module box of claim 1, wherein the junction box platform having a cage frame that is mechanically attached to a solar module frame and the base plate for distributing a physical load to the solar module frame from the base plate.

8. The universal solar module box of claim 1, wherein the plug sub-assembly comprises one or more micro-inverters.

9. The universal solar module box of claim 1, wherein the plug sub-assembly comprises one or more micro-inverters and electronics.

10. The universal solar module box of claim 1, wherein the solar module has a module frame, further comprising a cage metallic frame mechanically attached to the module frame and the base plate, thereby distributing a load and weight to the module frame from the base plate.

11. A universal solar module box mounted on a solar module, comprising:
   a junction box platform having a base plate, a blade block, and a cover, the base plate having a structure for attaching to one of a plurality of plug sub-assemblies dependent on a selection of a particular plug sub-assembly, the selected plug sub-assembly including electronics that optimize or invert a solar module output power for the solar module; and
   a singular modular diode block coupled electrically and mechanically to the junction box platform via the blade block, the singular modular diode block serving as a replaceable singular modular unit, including:
   a first diode having a first end and a second end,
   a second diode having a first end and a second end,
   a third diode having a first end and a second end,
   a first spring connector connecting to the first end of the first diode,
   a first electrical conducting blade connector disposed between the second end of the first diode and the first end of the second diode,
   a second electrical conducting blade connector disposed between the second end of the second diode and the first end of the third diode; and
   a second spring connector connecting to the second end of the third diode.

12. The universal solar module box of claim 11, wherein the particular plug sub-assembly comprises a plug block and a cable block, attachable to the junction box platform and the singular modular diode block, the particular plug sub-assembly providing a protective covering to weatherize the singular modular diode block, the blade block, and the cable block, the cable block attachable mechanically to the plug block, the cable block securing mechanically and electrically to one or more output cables.

13. A universal solar module box mounted on a solar module, comprising:
   a junction box platform having a base plate, a blade block, a cover, and a cage;
   a singular modular diode block coupled electrically and mechanically to the junction box platform via the blade block, the singular modular diode block serving as a replaceable singular modular unit, including:
   a first diode having a first end and a second end,
   a second diode having a first end and a second end,
   a third diode having a first end and a second end,
   a first spring connector connecting to the first end of the first diode,
   a first electrical conducting blade connector disposed between the second end of the first diode and the first end of the second diode,
   a second electrical conducting blade connector disposed between the second end of the second diode and the first end of the third diode;
   a second spring connector connecting to the second end of the third diode; and
      a plug sub-assembly having a plug block and a cable block, attachable to the junction box platform and the singular modular diode block, the plug sub-assembly providing a protective covering to weatherize the singular modular diode block, the blade block, and the cable block, the cable block attachable mechanically to the plug block, the cable block securing mechanically and electrically to one or more output cables.

14. The universal solar module box of claim 1, wherein the blade block having a first blade and a second blade; and wherein the singular modular diode block coupled electrically and mechanically to the junction box platform via the blade block, the singular modular diode block having a first connector and a second connector, the first blade of the blade block extending through the base plate and protruding through the first connector of the singular modular diode block for establishing an electrical connection between the first blade of the blade block and the first connector of the singular modular diode block, the second blade of the blade block extending through the base plate and protruding through the second connector of the singular modular diode block for establishing an electrical connection between the second blade of the blade block and the second connector of the singular modular diode block.

15. The universal solar module box of claim 1, wherein the replaceable modular unit comprises:
   a first diode having a first end and a second end,
   a second diode having a first end and a second end,
   a third diode having a first end and a second end,
   a first spring connector connecting to the first end of the first diode,
   a first electrical conducting blade connector disposed between the second end of the first diode and the first end of the second diode,
   a second electrical conducting blade connector disposed between the second end of the second diode and the first end of the third diode, and
   a second spring connector connecting to the second end of the third diode; and wherein the singular modular diode block is replaced by another singular modular diode block if the singular modular diode block becomes defective, without having to replace the entirety of the universal solar module box.

16. The universal solar module box of claim 15, wherein the singular modular diode block comprises a first connector coupled to one end of the first diode for establishing a first external connection, and a second connector coupled to one end of the third diode for establishing a second external connection.

17. The universal solar module box of claim 15, wherein the singular modular diode block comprises heat dissipating material surrounding the first diode, the second diode and the third diode.

18. The universal solar module box of claim 1, wherein the cover for providing a top cover over the blade block and the base plate.

19. The universal solar module box of claim 1, wherein the base plate having an extending arm that provides a one-way direct connection to the singular modular diode block.

20. The universal solar module box of claim 13, wherein the singular modular diode block comprises a first connector coupled to one end of the first diode for establishing a first external connection, and a second connector coupled to one end of the third diode for establishing a second external connection.

21. The universal solar module box of claim 13, wherein the singular modular diode block comprises heat dissipating material surrounding the first diode, the second diode and the third diode.

22. The universal solar module box of claim 13, wherein the base plate having an extending arm that provides a one-way direct connection to the singular modular diode block.

23. A universal solar module box mounted on a solar module, comprising:
  (a) a junction box platform having a base plate, a blade block, and a cover, the base plate having a structure for attaching to one of a plurality of plug sub-assemblies dependent on a selection of a particular plug sub-assembly, the selected plug sub-assembly including electronics that optimize or invert a solar module output power for the solar module;
  (b) a modular diode block (30) coupled electrically and mechanically to the junction box platform via the blade block, the entirety of the modular diode block serving as a singularly, independent, and replaceable modular unit that is inserted into the base plate with a cover for covering over a cavity of the base plate, the based plate is attached to the solar module, including:
    a first diode having a first end and a second end,
    a second diode having a first end and a second end,
    a third diode having a first end and a second end,
    a first spring connector connecting to the first end of the first diode,
    a first electrical conducting blade connector disposed between the second end of the first diode and the first end of the second diode,
    a second electrical conducting blade connector disposed between the second end of the second diode and the first end of the third diode;
    a second spring connector connecting to the second end of the third diode; and
  (c) a plug sub-assembly having a plug block and a cable block, attachable to the junction box platform and the modular diode block, the plug sub-assembly providing a protective covering to weatherize the modular diode block, the blade block, and the cable block, the cable block attachable mechanically to the plug block, the cable block securing mechanically and electrically to one or more output cables,
  wherein the modular diode block is replaced by another modular diode block if the singular modular diode block becomes defective, without having to replace the entirety of universal solar module box.

24. The universal solar module box of claim 23, wherein the based plate is attached to a backside of the solar module.

25. The universal solar module box of claim 23, wherein the based plate is glued to a backside of the solar module.

26. The universal solar module box of claim 23, wherein the based plate is affixed to a backside of the solar module.

27. A universal solar module box mounted on a solar module, comprising:
  a junction box platform having a base plate, a blade block, and a cover, the blade block having a first blade and a second blade;
  a modular diode block electrically and mechanically coupled to the junction box platform via the blade block, the modular diode block having a first spring connector (36a) and a second spring connector, the first blade of the blade block extending through the base plate and protruding through the modular diode block for establishing an electrical connection between the first blade of the blade block and the first spring connector of the modular diode block, the second blade of the blade block extending through the base plate and protruding through the modular diode block for establishing an electrical connection between the second blade of the blade block and the second spring connector of the modular diode block; and
  a plug sub-assembly having a plug block and a cable block, attachable to the junction box platform and the modular diode block, the plug sub-assembly providing a protective covering to weatherize the diode block, the blade block, and the cable block, the cable block attachable mechanically to the plug block, the cable block securing mechanically and electrically to one or more output cables.

28. The universal module box of claim 27, wherein the modular diode block comprises three diodes, the three diodes being connected in the modular diode block further comprise a first connector for establishing a first external connection of the modular diode block, the first connector being coupled to one end of the three diodes; and a second connector for establishing a second external connection of the modular diode block, the second connector being coupled to the other end of the three diodes.

29. The universal module box of claim 28, wherein the modular diode block comprises heat dissipating material surrounding each of the three diodes.

* * * * *